(12) United States Patent
Maetani et al.

(10) Patent No.: US 11,949,315 B2
(45) Date of Patent: Apr. 2, 2024

(54) MOTOR AND ELECTRIC APPARATUS INCLUDING THE SAME

(71) Applicant: WOLONG ELECTRIC GROUP CO., LTD., Shaoxing (CN)

(72) Inventors: Tatsuo Maetani, Shaoxing (CN); Yoshinori Isomura, Shaoxing (CN); Feng Hu, Shaoxing (CN)

(73) Assignee: WOLONG ELECTRIC GROUP CO., LTD., Zhejiang (CN)

( * ) Notice: Subject to any disclaimer, the term of this patent is extended or adjusted under 35 U.S.C. 154(b) by 372 days.

(21) Appl. No.: 17/536,976

(22) Filed: Nov. 29, 2021

(65) Prior Publication Data
US 2022/0181945 A1 Jun. 9, 2022

(30) Foreign Application Priority Data
Dec. 9, 2020 (JP) .................. 2020-204135

(51) Int. Cl.
*H02K 11/33* (2016.01)
*F04D 25/06* (2006.01)
(Continued)

(52) U.S. Cl.
CPC ........... *H02K 5/1732* (2013.01); *F04D 25/06* (2013.01); *F16C 35/06* (2013.01); *H02K 7/083* (2013.01);
(Continued)

(58) Field of Classification Search
CPC ................................... H02K 2211/03
(Continued)

(56) References Cited

U.S. PATENT DOCUMENTS 8,587,167 B2 * 11/2013 Kado ............... H02K 11/40
  310/71
8,912,696 B2 * 12/2014 Kawakubo ............ H02K 11/33
  310/85
(Continued)

FOREIGN PATENT DOCUMENTS

CN     102334265 A    1/2012
JP   2007-159302 A    6/2007
(Continued)

OTHER PUBLICATIONS

Maetani et al., "Approaches to Suppressing Shaft Voltage in Brushless DC Motor Driven by PWM Inverter", IEEE (Year: 2011).*
(Continued)

*Primary Examiner* — Tran N Nguyen
*Assistant Examiner* — Masoud Vaziri
(74) *Attorney, Agent, or Firm* — NKL Law; Allen Xue

(57) ABSTRACT

A motor according to the present disclosure includes a stator that includes a stator core around which a stator winding is wound; a rotating body that holds a plurality of magnets in a circumferential direction facing the stator or holds a plurality of magnets in a spoke shape from a center; a rotor that includes the rotating body, and a shaft fastened to the rotating body such that the shaft penetrates a center of the rotating body; two bearings that support the rotating body; a first metal bracket that fixes one bearing of the two bearings; and a second metal bracket that fixes the other bearing of the two bearings, and a capacitive member that has a capacitance $C_{sb1sb2}$ and is located between the first metal bracket and the second metal bracket.

9 Claims, 12 Drawing Sheets

(51) Int. Cl.
*F16C 35/06* (2006.01)
*H02K 5/173* (2006.01)
*H02K 7/08* (2006.01)
*H02K 21/14* (2006.01)

(52) U.S. Cl.
CPC ............ *H02K 11/33* (2016.01); *H02K 21/14* (2013.01); *F16C 2380/26* (2013.01); *H02K 2211/03* (2013.01)

(58) Field of Classification Search
USPC .............................................. 310/40 R, 68 R
See application file for complete search history.

(56) References Cited

U.S. PATENT DOCUMENTS

| | | | | |
|---|---|---|---|---|
| 2006/0186746 | A1* | 8/2006 | Nanbu | H02K 11/40 310/68 R |
| 2011/0234026 | A1 | 9/2011 | Mizukami et al. | |
| 2012/0038229 | A1* | 2/2012 | Watanabe | H02K 1/30 310/43 |
| 2012/0112588 | A1* | 5/2012 | Watanabe | H02K 11/40 310/90 |
| 2013/0119806 | A1* | 5/2013 | Watanabe | H02K 1/27 310/156.01 |
| 2014/0015363 | A1* | 1/2014 | Kowa | H02K 5/1732 310/156.01 |

FOREIGN PATENT DOCUMENTS

| | | |
|---|---|---|
| JP | 2010-158152 A | 7/2010 |
| JP | 4935934 B2 | 5/2012 |
| JP | 2012-130157 A | 7/2012 |
| WO | 2010/067616 A1 | 6/2010 |
| WO | 2015/001782 A1 | 1/2015 |

OTHER PUBLICATIONS

Maetani et al., "Approaches to Suppressing Shaft Voltage in Brushless DC Motor Driven by PWM Inverter Based on Ungrounded Common-Mode Equivalent Circuit", IEEJ Transactions on Industry Applications, (2012), vol. 132, No. 6, pp. 666-672. Cited in Specification. with Partial Translation. (9 pages).

* cited by examiner

MOTOR AND ELECTRIC APPARATUS INCLUDING THE SAME

CROSS REFERENCE TO RELATED APPLICATIONS

This application claims priority to Japanese Patent Application No. 2020-204135 filed on Dec. 9, 2020, the entire contents of which are incorporated by reference herein.

TECHNICAL FIELD

The present disclosure relates to a motor and an electric apparatus including the motor, and relates to a motor improved to suppress the occurrence of electrolytic corrosion of a bearing, and an electric apparatus including the motor.

BACKGROUND OF THE INVENTION

In recent years, there have been many cases where a brushless motor adopts a system of driving by a pulse width modulation (hereinafter, the method will be appropriately referred to as a PWM method) inverter. In the case of such driving by the PWM inverter, the neutral point potential of a stator winding fluctuates due to switching of a power element. The fluctuation of the neutral point potential is divided into the outer ring side of the bearing and the inner ring side of the bearing by the capacitance distribution of the motor.

Since the capacitance distribution on the stator side on the outer ring side of the bearing including the stator winding is different from the capacitance distribution on the rotor side of the capacitance on the inner ring side of the bearing including the stator winding, a potential difference (hereinafter, referred to as a shaft voltage) is generated between the outer ring of the bearing and the inner ring of the bearing. It is known that the shaft voltage includes a high-frequency component due to switching, and when the shaft voltage reaches a dielectric breakdown voltage of an oil film of grease inside the bearing, a minute current due to the dielectric breakdown of the oil film of grease flows inside the bearing, roughness occurs on a metal surface inside the bearing, and electrolytic corrosion occurs (for example, refer to Non-patent Document 1 and Patent Documents 1 to 4).

In addition, in a case where the electrolytic corrosion progresses, a wavy wear phenomenon may occur in the inner ring of the bearing, the outer ring of the bearing, or the ball of the bearing to cause an abnormal sound, which is one of the main causes of defects in the motor.

PRIOR ART DOCUMENTS

Patent Documents

Patent Document 1: JP 2010-158152 A
Patent Document 1: JP 4935934 B
Patent Document 1: JP 2007-159302 A
Patent Document 1: WO 2015/001782

Non-Patent Documents

Non-patent Document 1: Maetani, T., Isomura, Y., Watanabe, A., Iimori, K., & Morimoto, S. (2012). "Approaches to Suppressing Shaft Voltage in Brushless DC Motor Driven by PWM Inverter Based on Ungrounded Common-Mode Equivalent Circuit" IEEJ Transactions on Industry Applications in 2012, Vol. 132, No. 6, pp. 666-672.

SUMMARY OF THE INVENTION

The present disclosure aims to suppress the occurrence of electrolytic corrosion of a bearing in a motor and an electric apparatus including the motor.

A motor according to an aspect of the present disclosure includes a stator that includes a stator core and a stator winding wound around the stator core;

a rotor that includes a rotating body and a shaft, the rotating body holding magnets in a circumferential direction of the rotor and facing the stator, or holding magnets in a spoke shape from a center, the shaft fastened to the rotating body and penetrating a center of the rotating body;

a first bearing and a second bearing that each support the rotating body;

a first metal bracket and a second metal bracket that respectively fix the first bearing and the second bearing; and a capacitive member that is located between the first metal bracket and the second metal bracket, and has a capacitance $C_{sb1sb2}$ that is configured in such a manner that a combined capacitance A1 is increased to cause a first ratio to be approximated or matched to a second ratio, where the first shaft voltage $V_{sh1}$ and the second shaft voltage $V_{sh2}$ are respectively a voltage of the first bearing and a voltage of the second bearing, where the combined capacitance A1 includes the capacitance $C_{sb1sb2}$, a capacitance $C_{sb1}$ located between the stator core and the first metal bracket, and a capacitance $C_{sb2}$ located between the stator core and the second metal bracket, where the first ratio is a ratio of the combined capacitance A1 to a capacitance $C_{nb1}$ located between a portion having a zero reference potential of a drive circuit applying a voltage to the stator winding and the first metal bracket, where the second ratio is a ratio of a combined capacitance B1 to a capacitance $C_{ns}$ located between the portion having the zero reference potential and the shaft, and where the combined capacitance B1 includes a capacitance $C_i$ located between the stator winding and the stator core, a capacitance $C_g$ located between the stator core and the magnets, a capacitance $C_{sm}$ located between the stator winding and the magnets, and a capacitance $C_m$ being a capacitance of the magnets.

An electric apparatus according to another aspect of the present disclosure includes a motor; and a blower fan driven by the motor, wherein the motor includes:

a stator that includes a stator core and a stator winding wound around the stator core;

a rotor that includes a rotating body and a shaft, the rotating body holding magnets in a circumferential direction of the rotor and facing the stator, or holding magnets in a spoke shape from a center, the shaft fastened to the rotating body and penetrating a center of the rotating body;

a first bearing and a second bearing that each support the rotating body;

a first metal bracket and a second metal bracket that respectively fix the first bearing and the second bearing; and a capacitive member that is located between the first metal bracket and the second metal bracket, and has a capacitance $C_{sb1sb2}$ that is configured in such a manner that a combined capacitance A1 is increased to cause a first ratio to be approximated or matched to a second ratio, where the first shaft voltage $V_{sh1}$ and the second shaft voltage $V_{sh2}$ are respectively a voltage of the first bearing and a voltage of the second bearing, where the combined capacitance A1 includes the capacitance $C_{sb1sb2}$, a capacitance $C_{sb1}$ located between the stator core and the first metal bracket, and a capacitance $C_{sb2}$ located between the stator core and the second metal bracket, where the first ratio is a ratio of the combined capacitance A1 to a capacitance $C_{nb1}$ located between a portion having a zero reference potential of a drive circuit applying a voltage to the stator winding and the first metal bracket, where the second ratio is a ratio of a combined capacitance B1 to a capacitance $C_{ns}$ located between the portion having the zero reference potential and the shaft, and where the combined capacitance B1 includes a capacitance $C_i$ located between the stator winding and the stator core, a capacitance $C_g$ located between the stator core and the magnets, a capacitance $C_{sm}$ located between the stator winding and the magnets, and a capacitance $C_m$ being a capacitance of the magnets.

According to the aspect of the present disclosure, it is possible to suppress the occurrence of electrolytic corrosion of a bearing in a motor and an electric apparatus including the motor.

Note that these comprehensive or specific aspects may be implemented by a system, a method, an integrated circuit, a computer program, or a recording medium, or may be implemented by any combination of a system, an apparatus, a method, an integrated circuit, a computer program, and a recording medium.

DETAILED DESCRIPTION OF THE INVENTION (Findings on which the Present Disclosure is Based)

Prior to describing an embodiment of the present disclosure, knowledge on which the present disclosure is based will be described.

In the related art, the above-described documents have proposed a countermeasure for preventing dielectric breakdown of an oil film of grease of a bearing by reducing a shaft voltage to keep the oil film of the grease inside the bearing at a dielectric breakdown voltage or less, in order to suppress electrolytic corrosion of the bearing. In addition, a countermeasure for reducing damage of a metal surface inside the bearing by reducing the shaft voltage to reduce the discharge energy due to the dielectric breakdown of the oil film of the grease inside the bearing has been proposed in the above-described documents.

Hereinafter, the above-described documents will be described in detail.

Figure 8:
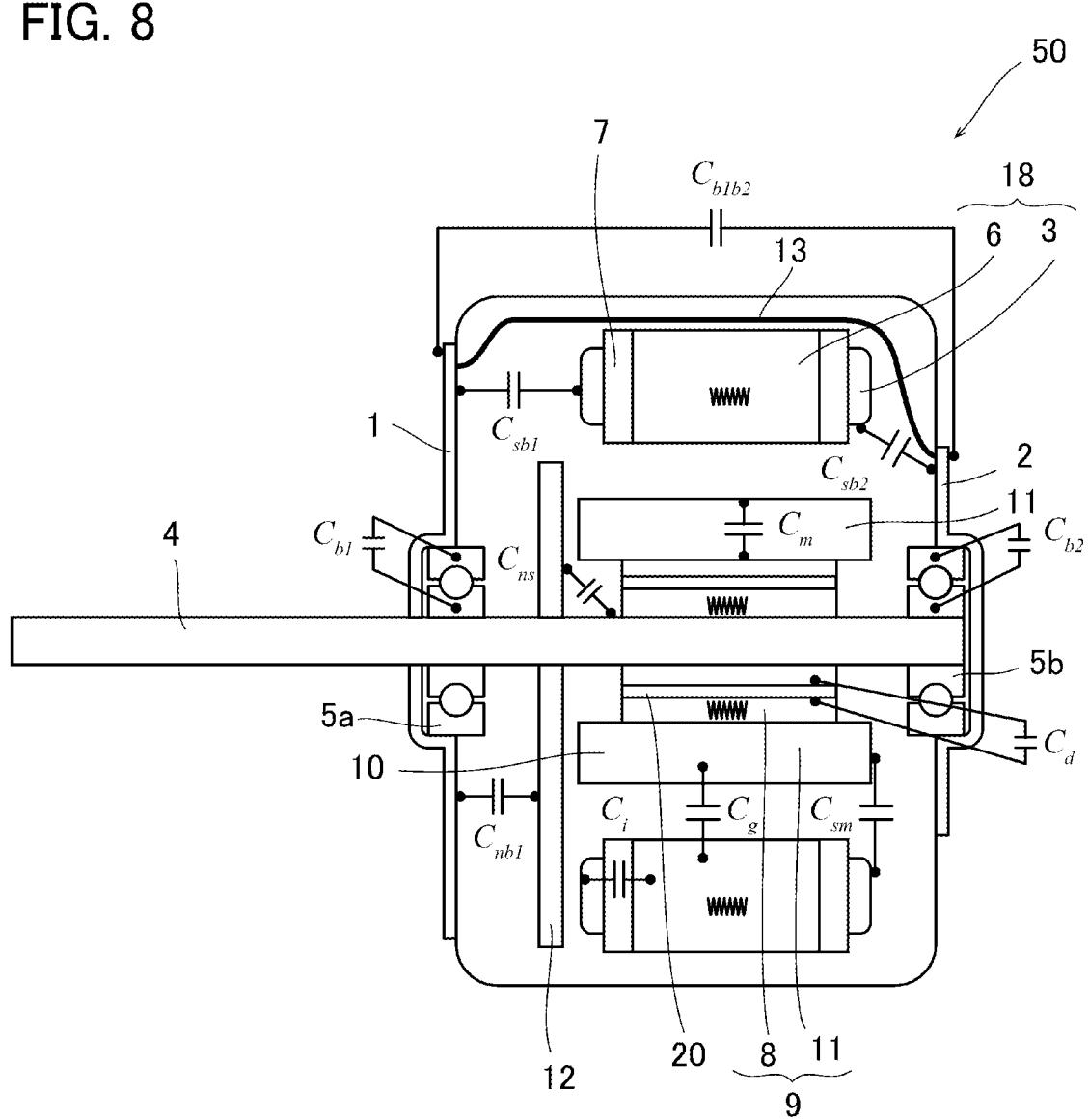
FIG. 8 is a schematic configuration diagram of a section of a motor in the related art.

FIG. 8 is a schematic configuration diagram of a section of an inner rotor type brushless radial motor 50 of Patent Document 1. Patent Document 1 and Non-patent Document 1 have the same configuration.

As illustrated in FIG. 8, the motor 50 includes first metal bracket 1 and second metal bracket 2 which are disposed at both ends of the motor 50, a pair of bearings (first bearing 5a and second bearing 5b), a shaft 4, a rotor 10, and a stator 18.

The rotating body 9 includes the rotor core 8, and the magnets 11 which are permanent magnets. The rotor 10 includes the rotating body 9, and the shaft 4. The stator 18 includes the stator core 6, and the stator winding 3.

As illustrated in FIG. 8, the outer ring of the first bearing 5a is connected to the first metal bracket 1, and the outer ring of the second bearing 5b is connected to the second metal bracket 2. The inner ring of the first bearing 5a and the inner ring of the second bearing 5b are connected by the shaft 4 to be electrically conducted. The first metal bracket 1 and the second metal bracket 2 are electrically short-circuited by a conductive member 13.

In Patent Document 1, the first metal bracket 1 and the second metal bracket 2 are electrically short-circuited by the conductive member 13, and the capacitance of the first metal bracket 1 and the capacitance of the second metal bracket 2 are matched with each other. Further, Patent Document 1 discloses a method in which a dielectric layer 20 is provided on the rotating body 9, and the shaft voltage is reduced by changing the capacitance of the rotating body 9.

Figure 9:
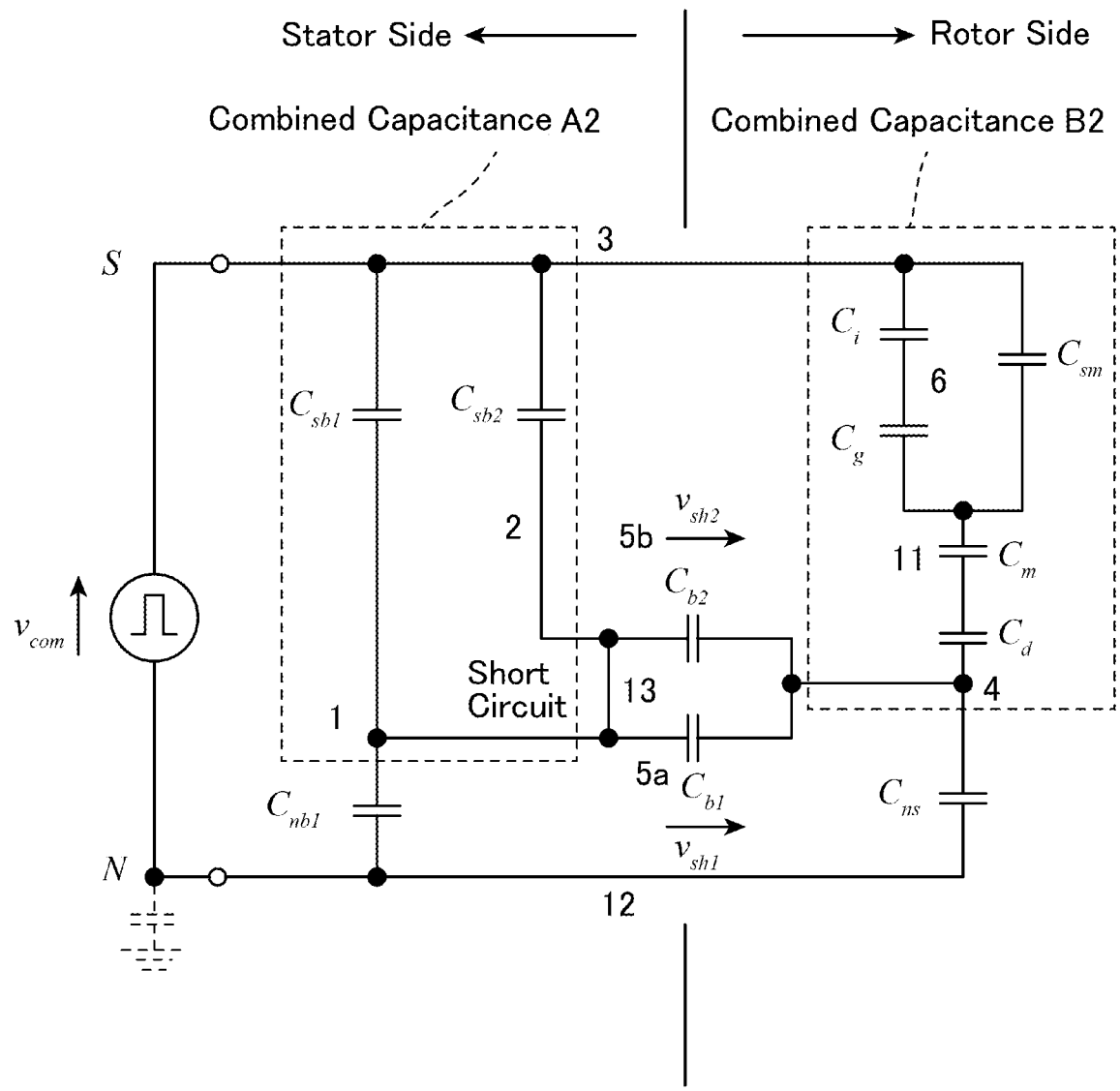
FIG. 9 is a diagram of a capacitance distribution model of the motor of FIG. 8.

FIG. 9 is a model diagram of a capacitance distribution of the motor 50 of Patent Document 1. In the motor 50 of Patent Document 1, when the capacitance distribution is considered with reference to the stator core 6, a voltage distribution of the motor 50 is dominated by the influence of the capacitive reactance which is the reciprocal of the impedance, and thus the description will be made using the capacitance distribution model as described in FIG. 5 of Non-patent Document 1.

A capacitance $C_{sb1}$ between the stator winding 3 and the first metal bracket 1 schematically represents that the charge of the first bearing is stored and a first shaft voltage $V_{sh1}$ is increased. When the first shaft voltage $V_{sh1}$ is increased to reach the dielectric breakdown voltage of the grease oil film inside the bearing, the dielectric breakdown occurs. Similarly to the capacitance $C_{sb1}$, a capacitance $C_{sb2}$ between the stator winding 3 and the second metal bracket 2 also schematically represents that the charge of the second bearing is stored and a second shaft voltage $V_{sh2}$ is increased. When the second shaft voltage $V_{sh2}$ is increased, the dielectric breakdown occurs.

The voltage generated on the outer ring side of the first bearing 5a and a zero potential reference N of a drive circuit is a value obtained by dividing a voltage $V_{com}$ generated between the zero reference potential N of the drive circuit and a neutral point potential S of the stator winding 3 by the capacitance distribution on the stator side.

Further, the voltage generated on the outer ring side of the second bearing 5b and a zero potential reference N(12) of the drive circuit is a value obtained by dividing a voltage $V_{com}$ generated between the zero reference potential N(12) of the drive circuit and a neutral point potential S of the stator winding 3 by the capacitance distribution on the stator side.

The voltage generated on the inner ring side of the first bearing 5a, the inner ring side of the second bearing 5b (four locations in FIG. 9), and the zero potential reference N of the drive circuit is a value obtained by dividing the voltage $V_{com}$ generated between the zero potential reference N of the drive circuit and the neutral point potential S of the stator winding 3 by the capacitance distribution on the rotor side.

The present inventors have devised the capacitance distribution of FIG. 9, and have found the following findings. The first shaft voltage $V_{sh1}$ and the second shaft voltage $V_{sh2}$ are a difference between the voltage generated on the outer ring side of the first bearing 5a and the outer ring side of the second bearing 5b and the voltage generated on the inner ring side. Therefore, it has been found that it is necessary to match or approximate the distribution of the capacitance on the stator side and the distribution of the capacitance on the rotor side in order to reduce the first shaft voltage $V_{sh1}$ and the second shaft voltage $V_{sh2}$.

The voltage generated on the outer ring side of the first bearing 5a, the outer ring side of the second bearing 5b, and the zero potential reference N of the drive circuit is a voltage division ratio A2 ($C_{nb1}$/combined capacitance A2) of a capacitance $C_{nb1}$ between the zero reference potential N of the drive circuit and the first metal bracket 1, and a combined capacitance A2 of the capacitance $C_{sb1}$ between the stator winding 3 and the first metal bracket 1 and the capacitance $C_{sb2}$ between the stator winding 3 and the second metal bracket 2.

Further, the voltage generated on the inner ring side of the first bearing 5a, the inner ring side of the second bearing 5b, and the zero potential reference N of the drive circuit is a voltage division ratio B2 ($C_{ns}$/combined capacitance B2) of a capacitance $C_{ns}$ between the zero reference potential N of the drive circuit and the shaft 4, and a combined capacitance B2 of a capacitance $C_i$ between the stator winding 3 and the stator core 6, a capacitance $C_g$ between the stator core 6 and the magnets 11, a capacitance $C_{sm}$ between the stator winding 3 and the magnets 11, and a capacitance $C_m$ of the magnets 11.

As a result of intensive studies, the present inventors have found that the voltage division ratio A2 ($C_{nb1}$/combined capacitance A2) and the voltage division ratio B2 ($C_{ns}$/combined capacitance B2) are matched or approximated in order to reduce the first shaft voltage $V_{sh1}$ and the second shaft voltage $V_{sh2}$. Matching or approximating the voltage division ratio A2 and the voltage division ratio B2 is hereinafter simply referred to as matching.

In Patent Document 1, since the capacitances $C_{nb1}$, $C_{sb2}$, and $C_{ns}$ are smaller than the combined capacitance B2, the present inventors have found that a method of reducing the capacitance of the combined capacitance B2 is adopted in order to match the capacitances.

In Patent Document 1, in the capacitance distribution on the rotor 10 side, the dielectric layer 20 is provided on the rotating body 9 to form the capacitance $C_d$. In the capacitance distribution model, a method has been found in which the capacitance $C_d$ of the dielectric is inserted in series into the capacitance $C_m$ of the magnets to reduce the combined capacitance B2, so that the capacitance $C_d$ is matched with the capacitance distribution on the stator side, and the first shaft voltage $V_{sh1}$ and the second shaft voltage $V_{sh2}$ are decreased.

The capacitance $C_d$ of the dielectric layer 20 is inversely proportional to the distance in a thickness direction of the dielectric layer 20 (the distance in a short direction of the dielectric layer 20 in FIG. 8), and is proportional to the length (the distance in the longitudinal direction of the dielectric layer 20 in FIG. 8). Therefore, in order to lower the capacitance $C_d$, it is necessary to increase the width of the dielectric layer 20.

However, in Patent Document 1, as illustrated in FIG. 8, since stress is applied to the dielectric layer 20 as rotational torque, there is a case where the width of the dielectric layer 20 is restricted in order to secure the strength. In that case, it has been considered that the required capacitance is not obtained and the shaft voltage is not completely lowered. In addition, in Patent Document 1, in the motor 50 using the rotating body 9 that holds a plurality of permanent magnets (magnets) in a spoke shape from the center in a radial direction, there is a problem in that it is necessary to shorten the length of the permanent magnets (magnets) 11 by taking the width of the dielectric layer 20 and thus the performance of the motor 50 deteriorates.

Next, Patent Document 2 will be described.

Figure 10:
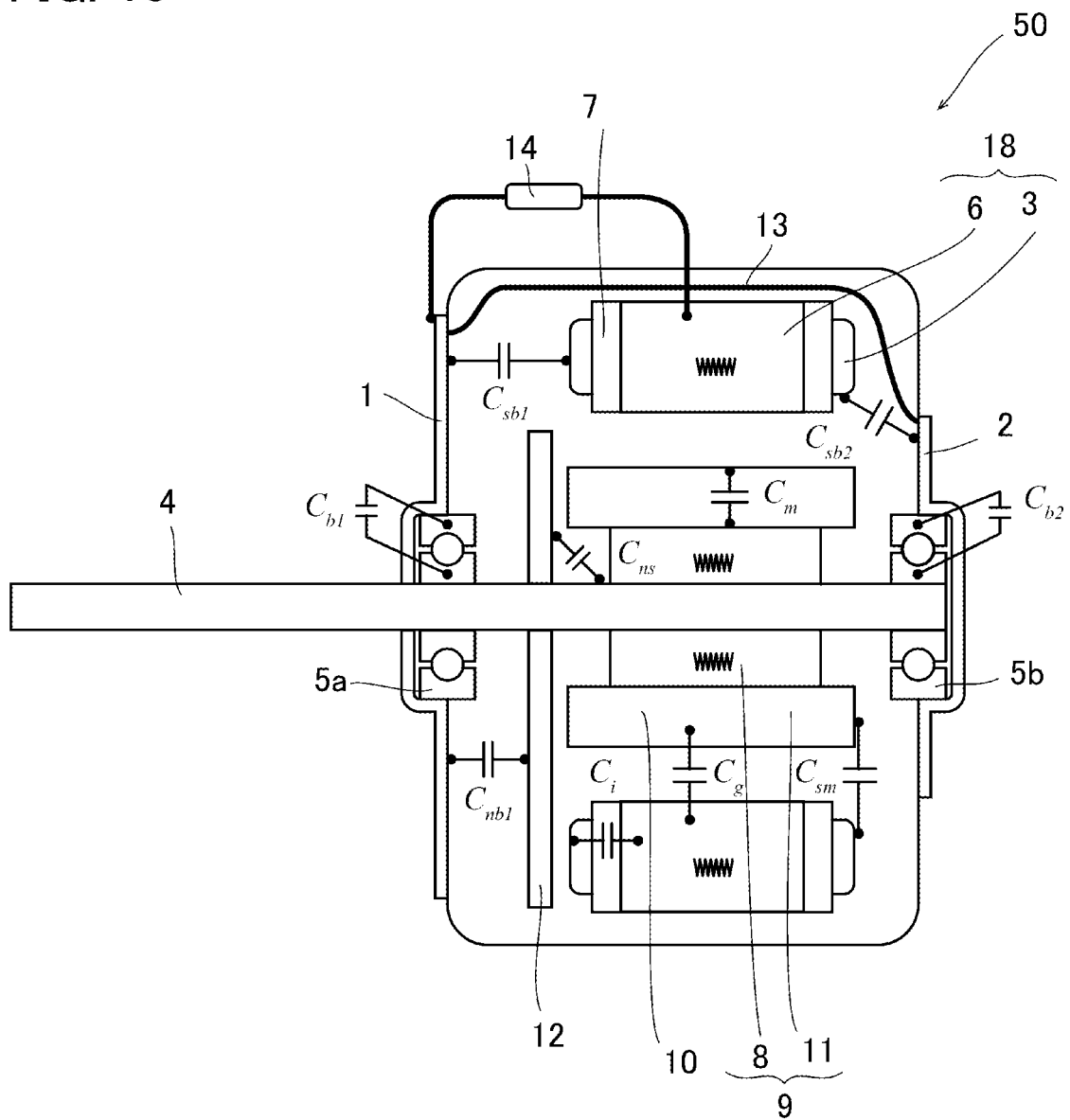
FIG. 10 is a schematic configuration diagram of a section of another motor in the related art.
Figure 11:
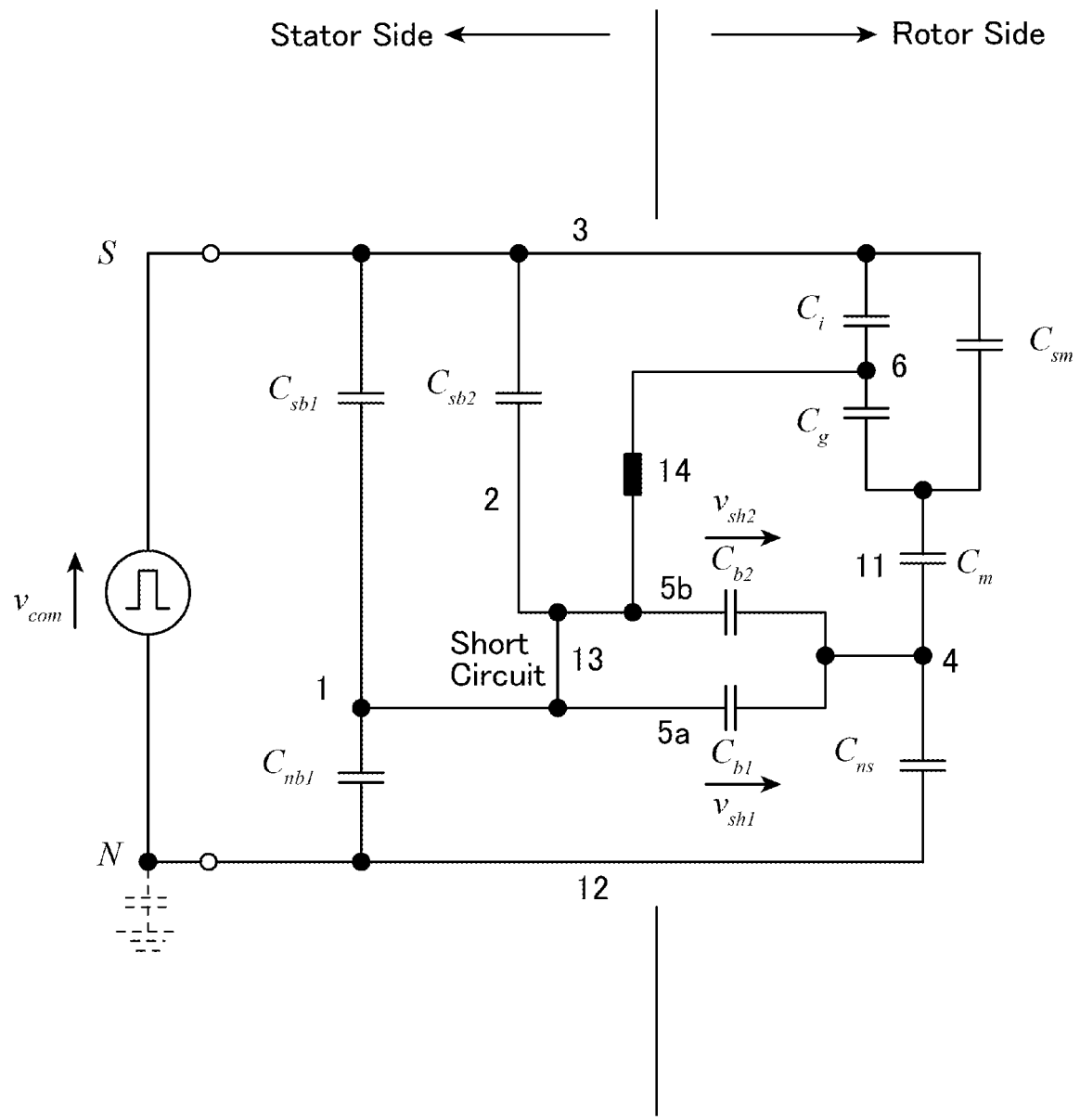
FIG. 11 is a diagram of a capacitance distribution model of the motor of FIG. 10.

FIG. 10 is a schematic configuration diagram of a section of the motor 50 of Patent Document 2. FIG. 11 is a diagram of a capacitance distribution model of the motor 50 illustrated in FIG. 10.

As illustrated in FIG. 10, the first metal bracket 1 and the second metal bracket 2 are short-circuited by the connecting member 13. An impedance adjusting member 14 is inserted between the stator core 6 and any one of the first metal bracket 1 and the second metal bracket 2.

In a case where a capacitor having a capacitance is used as the impedance adjusting member 14, the impedance adjusting member 14, which is the capacitance for impedance adjustment, is connected in parallel with the combined capacitance of the capacitances $C_i$, $C_{sb1}$, and $C_{sb2}$. By increasing the combined capacitance of the capacitances $C_i$, $C_{sb1}$, and $C_{sb2}$, matching with the capacitance on the rotor side is achieved. As a result, in Patent Document 2, the first shaft voltage $V_{sh1}$ and the second shaft voltage $V_{sh2}$ can be reduced.

However, it is difficult to establish a method of connecting the impedance adjusting member 14 to the stator core 6. In addition, since molding is performed after the connection, a problem that the connection portion is detached in the production process has been considered.

Next, Patent Document 3 will be described.

Figure 12:
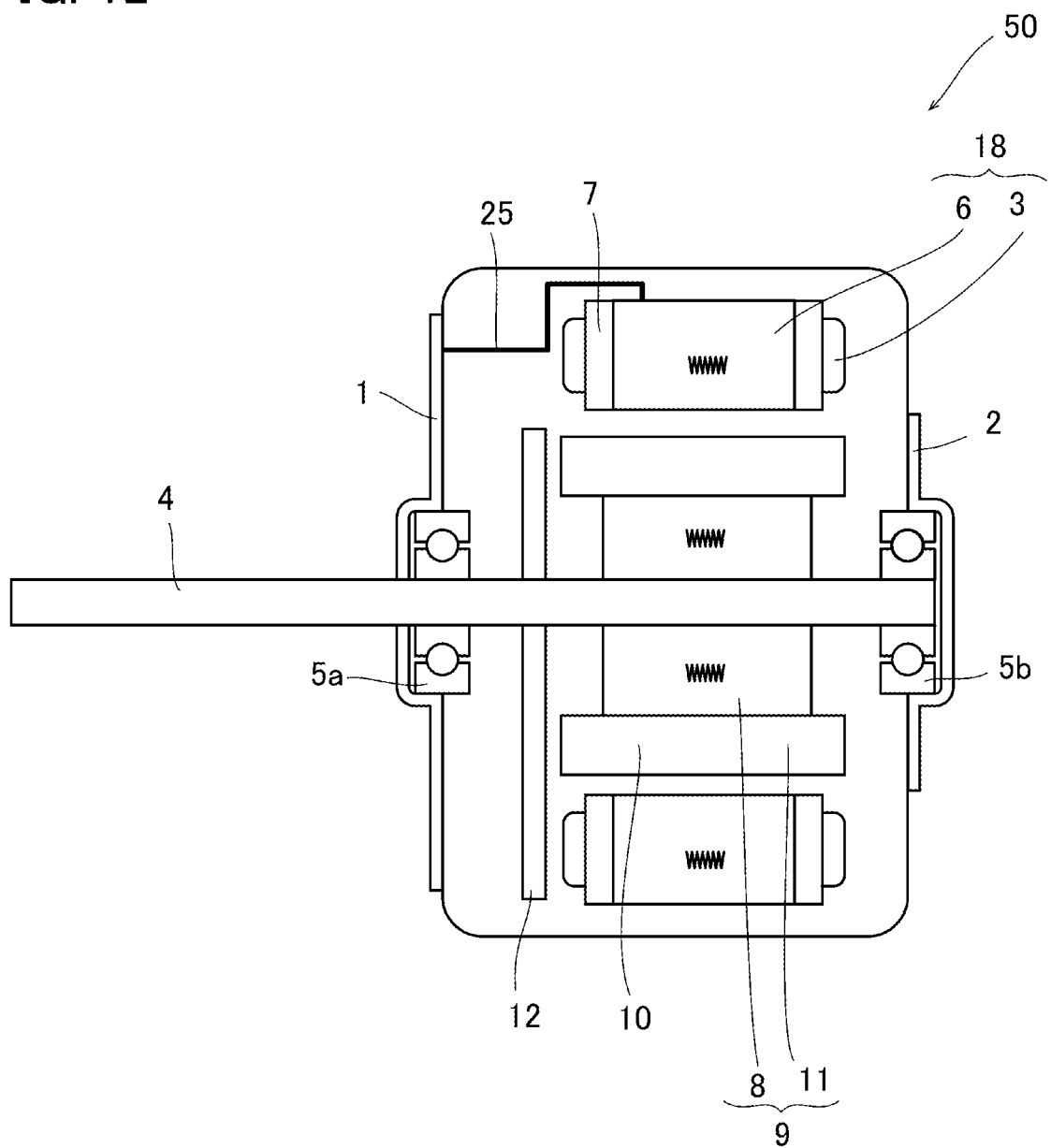
FIG. 12 is a schematic configuration diagram of a section of another motor in the related art.

FIG. 12 is a schematic configuration diagram of a section of the motor 50 in Patent Document 3.

In Patent Document 3, the stator core 6 and any one of the first metal bracket 1 and the second metal bracket 2 are short-circuited by a short circuit member 25. In FIG. 12 of Patent Document 3, the stator core 6 and first metal bracket 1 are short-circuited to reduce the first shaft voltage $V_{sh1}$.

In the configuration of Patent Document 3, a similar configuration is described in FIG. 10 of Patent Document 2. In a third comparative example of Patent Document 2, it is disclosed that the configuration of Patent Document 3 has a problem that a waveform collapse occurs in the shaft voltage.

This is presumed to be because the capacitance between the stator core 6 and the first metal bracket 1 that is short-circuited to the stator core 6 is increased, but the capacitance between the stator core 6 and the second metal bracket 2 that is not short-circuited to the stator core 6 is not changed. Therefore, it has been considered that the second shaft voltage $V_{sh2}$ is not decreased, and the electrolytic corrosion suppressing effect is small.

Finally, Patent Document 4 will be described.

Figure 13:
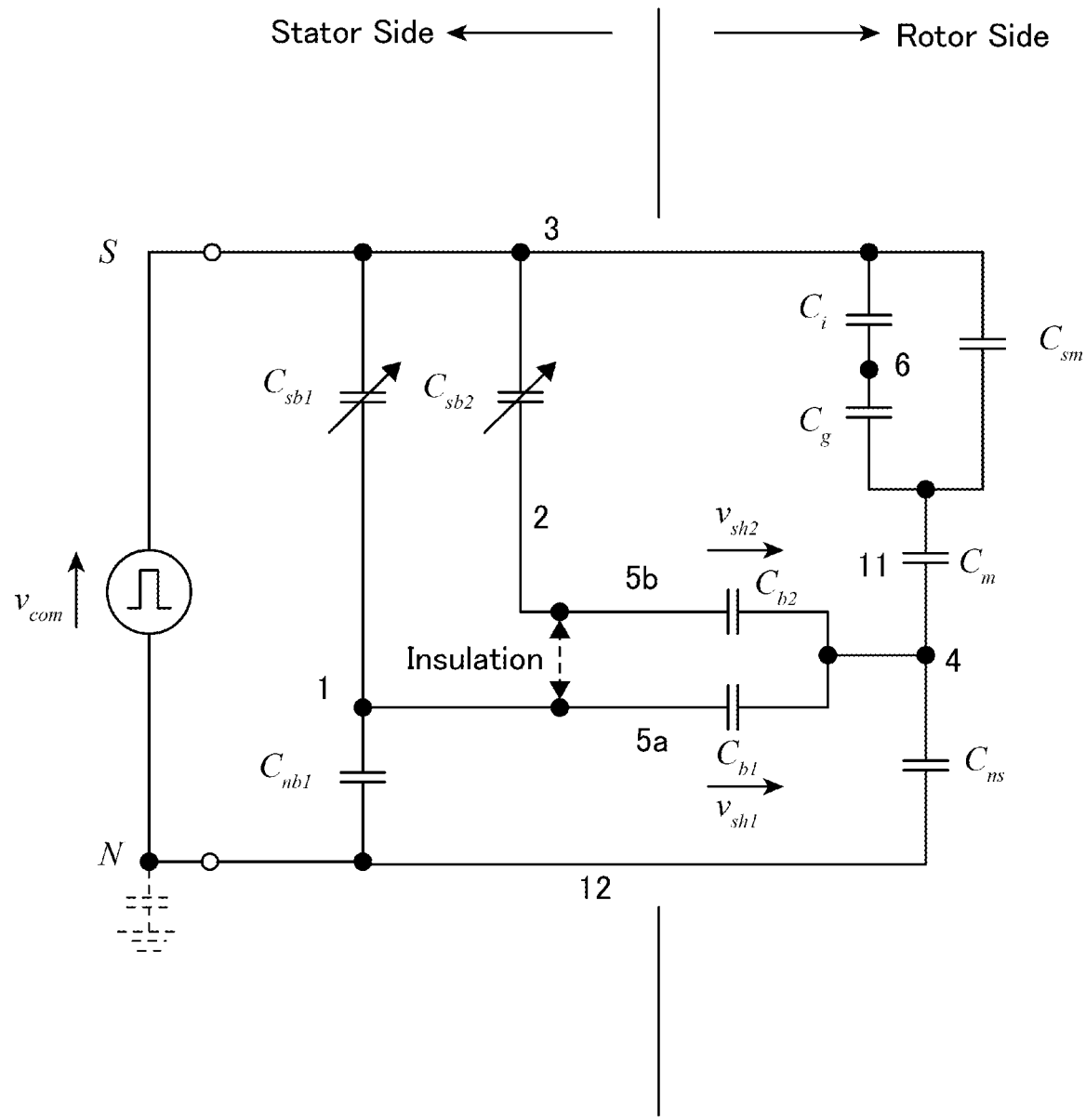
FIG. 13 is a diagram of a capacitance distribution model of another motor in the related art.

FIG. 13 is a diagram of a capacitance distribution model of the motor 50.

As illustrated in FIG. 13, a method is disclosed in which the first metal bracket 1 and the second metal bracket 2 are electrically insulated, the capacitance $C_{sb1}$ between the stator core 6 and the first metal bracket 1 and the capacitance $C_{sb2}$ between the stator core 6 and the second metal bracket 2 are set so as to approximate or match each other, and the shaft voltage is reduced.

However, as described above, in the embodiment of Patent Document 4 in the related art, for adjusting the ratio between the capacitance $C_{sb1}$ and the capacitance $C_{sb2}$, it is necessary to adjust the dimensions of the members and adjust the distance or the like between the members, and thus, the concern that the outer dimensions and the shape of the motor are increased has been considered.

In addition, the matching adjustment function of the capacitance with respect to the capacitance distribution on the rotor side is insufficient, and the first shaft voltage $V_{sh1}$ and the second shaft voltage $V_{sh2}$ cannot be completely lowered. Consequently, it has been considered that waveform collapse of the first shaft voltage $V_{sh1}$ and the second shaft voltage $V_{sh2}$ as the dielectric breakdown phenomenon of the grease of the first bearing 5a and the second bearing 5b occurs, and there is a problem in electrolytic corrosion life in long-term operation.

The present inventors have found the above-described problems, and have conducted intensive studies on the solution of the problems, leading to the following disclosure.

Figure 1:
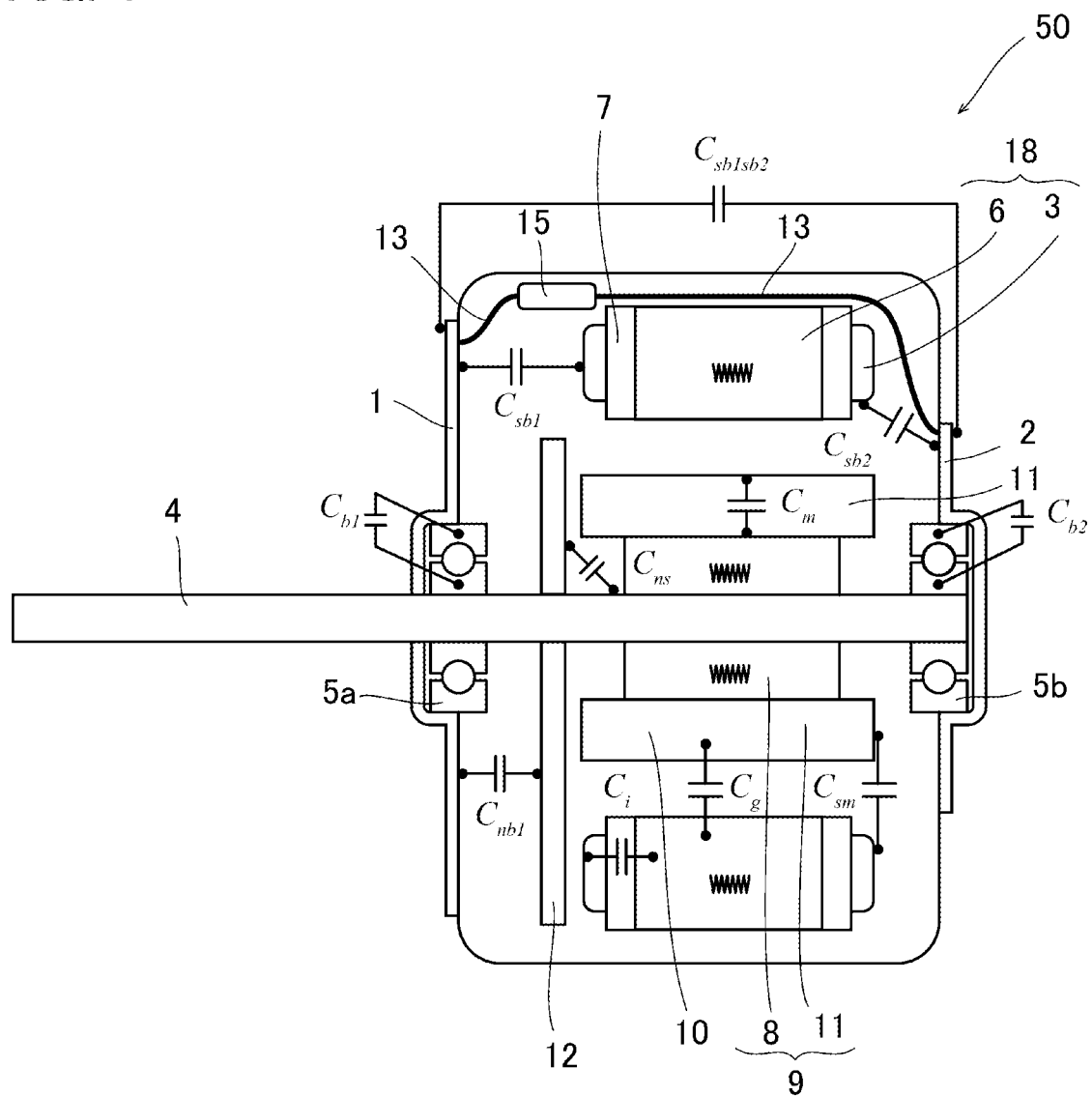
FIG. 1 is a schematic configuration diagram of a section of a motor according to a first embodiment as an aspect of the present disclosure.

FIG. 1 is a schematic configuration diagram of a section of the motor 50 in the present disclosure.

As illustrated in FIG. 1, the motor 50 includes the first metal bracket 1 and the second metal bracket 2 which are disposed at both ends of the motor 50, the first bearing 5a, the second bearing 5b, the shaft 4, the rotor 10, and the stator 18. The rotating body 9 includes the rotor core 8, and the magnets 11 which are permanent magnets. The rotor 10 includes the rotating body 9, and the shaft 4. The stator 18 includes the stator core 6, and the stator winding 3. A capacitive member 15 having capacitance $C_{sb1sb2}$ is disposed between the first metal bracket 1 and the second metal bracket 2.

Figure 2:
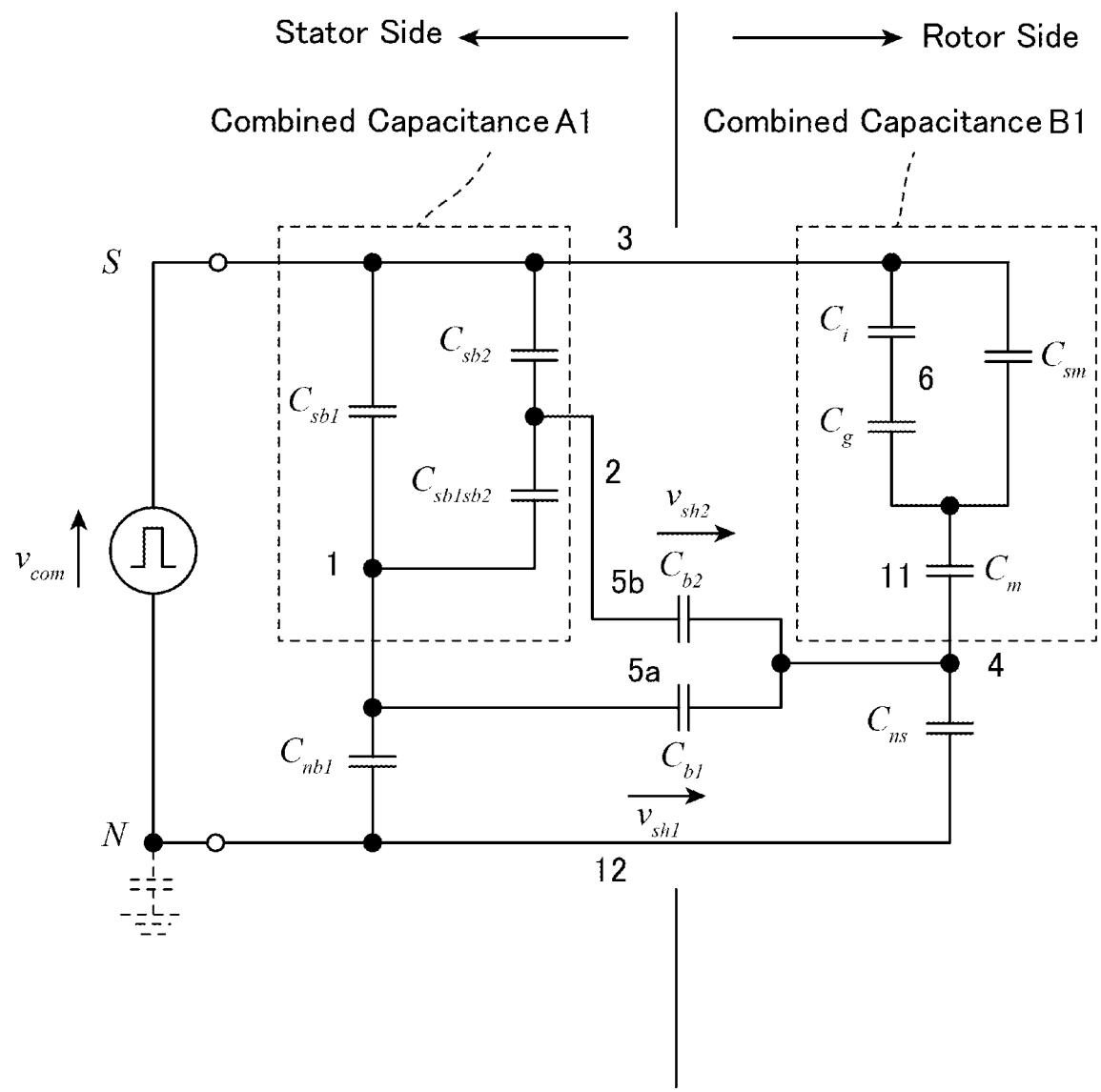
FIG. 2 is a diagram of a capacitance distribution model of the motor according to the first embodiment.

FIG. 2 is a diagram illustrating a capacitance distribution model of the motor 50 in the present disclosure.

By inserting the capacitive member 15 of the capacitance $C_{sb1sb2}$ between the first metal bracket 1 and the second metal bracket 2, a series circuit of the capacitance $C_{sb2}$ between the stator winding 3 and the second metal bracket 2 and the capacitance $C_{sb1sb2}$ of the capacitive member 15 is formed. Furthermore, a parallel circuit of the series circuit and the capacitance $C_{sb1}$ between the stator winding 3 and the first metal bracket 1 is formed. A combined capacitance A1 can be adjusted by adjusting the capacitance $C_{sb1sb2}$ of the capacitive member 15. Here, the combined capacitance A1 is a combined capacitance of the capacitance $C_{sb1}$, the capacitance $C_{sb2}$, and the capacitance $C_{sb1sb2}$. A combined capacitance B1 is a combined capacitance of the capacitance $C_i$ between the stator winding 3 and the stator core 6, the capacitance $C_g$ between the stator core 6 and the magnets 11, the capacitance $C_{sm}$ between the stator winding 3 and the magnets 11, and the capacitance $C_m$ of the magnets 11.

Specifically, the present inventors have found that the combined capacitance A1 is increased by increasing the capacitance $C_{sb1sb2}$, so that a voltage division ratio A1 ($C_{nb1}$/combined capacitance A1) and a voltage division ratio B1 ($C_{ns}$/combined capacitance B1) are matched or approximated. As a result, the present inventors have come up with a method of reducing the shaft voltage by matching the capacitance distribution on the stator side and the capacitance distribution on the rotor side.

Based on the above consideration, the present inventors have come up with an aspect of the present disclosure described below.

A motor according to an aspect of the present disclosure includes a stator that includes a stator core and a stator winding wound around the stator core;

a rotor that includes a rotating body and a shaft, the rotating body holding magnets in a circumferential direction of the rotor and facing the stator, or holding magnets in a spoke shape from a center, the shaft fastened to the rotating body and penetrating a center of the rotating body;

a first bearing and a second bearing that each support the rotating body;

a first metal bracket and a second metal bracket that respectively fix the first bearing and the second bearing; and a capacitive member that is located between the first metal bracket and the second metal bracket, and has a capacitance $C_{sb1sb2}$ that is configured in such a manner that a combined capacitance A1 is increased to cause a first ratio to be approximated or matched to a second ratio, where the first shaft voltage $V_{sh1}$ and the second shaft voltage $V_{sh2}$ are respectively a voltage of the first bearing and a voltage of the second bearing, where the combined capacitance A1 includes the capacitance $C_{sb1sb2}$, a capacitance $C_{sb1}$ located between the stator core and the first metal bracket, and a capacitance $C_{sb2}$ located between the stator core and the second metal bracket, where the first ratio is a ratio of the combined capacitance A1 to a capacitance $C_{nb1}$ located between a portion having a zero reference potential of a drive circuit applying a voltage to the stator winding and the first metal bracket, where the second ratio is a ratio of a combined capacitance B1 to a capacitance $C_{ons}$ located between the portion having the zero reference potential and the shaft, and where the combined capacitance B1 includes a capacitance $C_i$ located between the stator winding and the stator core, a capacitance $C_g$ located between the stator core and the magnets, a capacitance $C_{sm}$ located between the stator winding and the magnets, and a capacitance $C_m$ being a capacitance of the magnets.

According to the above aspect, the combined capacitance A1 is increased by increasing the capacitance $C_{sb1sb2}$, so that the voltage division ratio A1 ($C_{nb1}$/combined capacitance A1) and the voltage division ratio B1 ($C_{ns}$/combined capacitance B1) are matched or approximated, and thereby the occurrence of electrolytic corrosion of the bearing in the motor can be suppressed.

An electric apparatus according to another aspect of the present disclosure includes a motor; and a blower fan driven by the motor, wherein the motor includes:

a stator that includes a stator core and a stator winding wound around the stator core;

a rotor that includes a rotating body and a shaft, the rotating body holding magnets in a circumferential direction of the rotor and facing the stator, or holding magnets in a spoke shape from a center, the shaft fastened to the rotating body and penetrating a center of the rotating body;

a first bearing and a second bearing that each support the rotating body;

a first metal bracket and a second metal bracket that respectively fix the first bearing and the second bearing; and a capacitive member that is located between the first metal bracket and the second metal bracket, and has a capacitance $C_{sb1sb2}$ that is configured in such a manner that a combined capacitance A1 is increased to cause a first ratio to be approximated or matched to a second ratio, where the first shaft voltage $V_{sh1}$ and the second shaft voltage $V_{sh2}$ are respectively a voltage of the first bearing and a voltage of the second bearing, where the combined capacitance A1 includes the capacitance $C_{sb1sb2}$, a capacitance $C_{sb1}$ located between the stator core and the first metal bracket, and a capacitance $C_{sb2}$ located between the stator core and the second metal bracket, where the first ratio is a ratio of the combined capacitance A1 to a capacitance $C_{nb1}$ located between a portion having a zero reference potential of a drive circuit applying a voltage to the stator winding and the first metal bracket, where the second ratio is a ratio of a combined capacitance B1 to a capacitance $C_{ns}$ located between the portion having the zero reference potential and the shaft, and where the combined capacitance B1 includes a capacitance $C_i$ located between the stator winding and the stator core, a capacitance $C_g$ located between the stator core and the magnets, a capacitance $C_{sm}$ located between the stator winding and the magnets, and a capacitance $C_m$ being a capacitance of the magnets.

According to the above aspect, the combined capacitance A1 is increased by increasing the capacitance $C_{sb1sb2}$, so that the voltage division ratio A1 ($C_{nb1}$/combined capacitance A1) and the voltage division ratio B1 ($C_{ns}$/combined capacitance B1) are matched or approximated, and thereby the occurrence of electrolytic corrosion of the bearing in the motor of the electric apparatus can be suppressed.

Hereinafter, more specific embodiments of the present disclosure will be described. However, unnecessarily detailed description may be omitted. For example, a detailed description of a well-known matter and a repeated description of substantially the same configuration may be omitted. This is to avoid unnecessary redundancy of the following description and to facilitate understanding of those skilled in the art. Note that the present inventors provide the accompanying drawings and the following description in order for those skilled in the art to fully understand the present disclosure, and do not intend to limit the subject matter described in the claims by the accompanying drawings and the following description. In the following description, the same or similar components are denoted by the same reference numerals.

First Embodiment

Hereinafter, a motor according to an aspect of the present disclosure will be described with reference to the drawings.

FIG. 1 is a schematic configuration diagram of a section of the inner rotor type brushless radial motor 50 illustrating an aspect of the present disclosure.

As illustrated in FIG. 1, the first metal bracket 1 having conductivity and the second metal bracket 2 having conductivity are disposed at both ends of the motor 50. The outer diameter of the first metal bracket 1 is the same as or larger than the outer diameter of the second metal bracket 2. As a result, the bearing is stably supported, and the shaft 4 can be rotated.

The first bearing 5a fixed to the first metal bracket 1 is disposed at the central portion of the first metal bracket 1, and the second bearing 5b fixed to the second metal bracket 2 is disposed at the central portion of the second metal bracket 2. The shaft 4 is supported and rotated by the first bearing 5a and the second bearing 5b. The shaft 4 protrudes from the first metal bracket 1.

The stator 18 generates a rotating magnetic field to rotate the rotor 10 by the rotating magnetic field. The rotor 10 is inserted into the inner side of the stator 18 with a gap between the rotor 10 and the stator 18.

The stator 18 includes the stator core 6 and the stator winding 3 which is a winding. The stator winding 3 is wound around the stator core 6 with a resin 7 for insulating the stator core 6 interposed therebetween. Such stator core 6 is molded with a molding material of resin together with other fixing members such as the first metal bracket 1 and the second metal bracket 2. In the first embodiment, these members are molded integrally in this manner to form a stator of which the outer shape is a substantially cylindrical shape. The integrally molded product also functions as a housing of the motor 50. The first metal bracket 1 and the second metal bracket 2 may be insulated from the stator core 6 with a space.

The rotor 10 is rotated in the motor 50, and includes the shaft 4 and the rotating body 9. The rotating body 9 includes the rotor core 8, and the magnets 11 that are permanent magnets as ferrite magnets. The rotor 10 holds a plurality of magnets 11 on the outer periphery of the rotor core 8, and includes the shaft 4 such that the shaft 4 penetrates the center of the rotor core 8. Furthermore, the rotor 10 may hold the plurality of magnets 11 in a spoke shape from the center and face the stator 18.

The first bearing 5a and the second bearing 5b that support the shaft 4 are attached to the shaft 4. The first bearing 5a and the second bearing 5b are cylindrical-shaped bearings having a plurality of iron balls, and the inner ring side of the first bearing 5a and the inner ring side of the second bearing 5b are fixed to the shaft 4.

In the first bearing 5a and the second bearing 5b, the outer ring side of the first bearing 5a and the outer ring side of the second bearing 5b are fixed by the first metal bracket 1 having conductivity and the second metal bracket 2 having conductivity, respectively. In FIG. 1, the first bearing 5a is fixed to the first metal bracket 1, the second bearing 5b is fixed to the second metal bracket 2, the shaft 4 is supported by two bearings, and the rotor 10 is rotated rotatably.

Further, a printed circuit board 12 on which a drive circuit for generating a rotating magnetic field is mounted is disposed between the rotor 10 and the first metal bracket 1 inside the motor 50. For example, an inverter circuit or the like is mounted on the drive circuit in order to apply a voltage to the stator winding 3.

In the motor 50 configured as described above, when a voltage is applied to the stator winding 3 from the drive circuit, a current flows through the stator winding 3, and a magnetic field is generated from the stator core 6. Then, due to the rotating magnetic field from the stator core 6 and the magnetic field from the magnets 11, attractive force and repulsive force are generated according to the polarity of these magnetic fields, and the rotor 10 is rotated around the shaft 4 by these forces.

As illustrated in FIG. 1, one end portion of the conductive member 13, which is a short-circuit line, is electrically connected to the second metal bracket 2, and the other end portion of the conductive member 13 is electrically connected to the capacitive member 15. One end portion of the conductive member 13, which is a short-circuit line, is electrically connected to the capacitive member 15, and the other end portion of the conductive member 13 is electrically connected to the first metal bracket 1. For example, the capacitive member 15 is disposed in a space on the first metal bracket 1 side. For example, the capacitive member 15 is disposed in a space between the stator core 6 and the first metal bracket 1.

The capacitive member 15 is, for example, a ceramic capacitor. The capacitive member 15 is, for example, a molded product in which electrodes are provided on both sides of a resin such as PBT. The form of the capacitive member 15 is not particularly limited as long as the capacitive member can store charges. The capacitive member 15 may be disposed anywhere inside the motor 50, and is disposed, for example, on an inner wall of the housing of the motor 50.

With this configuration, in the motor 50, the capacitive member 15 is disposed between the first metal bracket 1 and the second metal bracket 2, and the first metal bracket 1 and the second metal bracket 2 can be electrically connected to the capacitive member 15.

FIG. 2 is a diagram of a capacitance distribution model in the first embodiment. The capacitance of the capacitive member 15 inserted between the first metal bracket 1 and the second metal bracket 2 is defined as $C_{sb1sb2}$. The capacitance $C_{sb1sb2}$ constitutes a series circuit with the capacitance $C_{sb2}$ between the stator winding 3 and the second metal bracket 2. Further, this series circuit constitutes a parallel circuit with the capacitance $C_{sb1}$ between the stator winding 3 and the first metal bracket 1, and becomes a series-parallel combined capacitance A1 (hereinafter, referred to as the combined capacitance A1). The capacitance $C_i$ between the stator winding 3 and the stator core 6, the capacitance $C_g$ between the stator core 6 and the magnets 11, the capacitance $C_{sm}$ between the stator winding 3 and the magnets 11, and the capacitance $C_m$ of the magnets 11 are configured in series or parallel to become a series-parallel combined capacitance B1 (hereinafter, referred to as the combined capacitance B1).

In order to approximate the capacitance distribution on the stator 18 side and the capacitance distribution on the rotor 10 side, the ratio ($C_{nb1}$/combined capacitance A1) of the capacitance $C_{nb1}$ to the combined capacitance A1 and the ratio ($C_{ns}$/combined capacitance B1) of the capacitance $C_{ns}$ to the combined capacitance B1 are approximated with reference to the inner ring and the outer ring of the first bearing 5a and the inner ring and the outer ring of the second bearing 5b, the capacitance $C_{nb1}$ located between the zero reference potential N of the drive circuit and the first metal bracket 1, the capacitance $C_{ns}$ located between the zero reference potential N of the drive circuit and the shaft 4.

Figure 3:
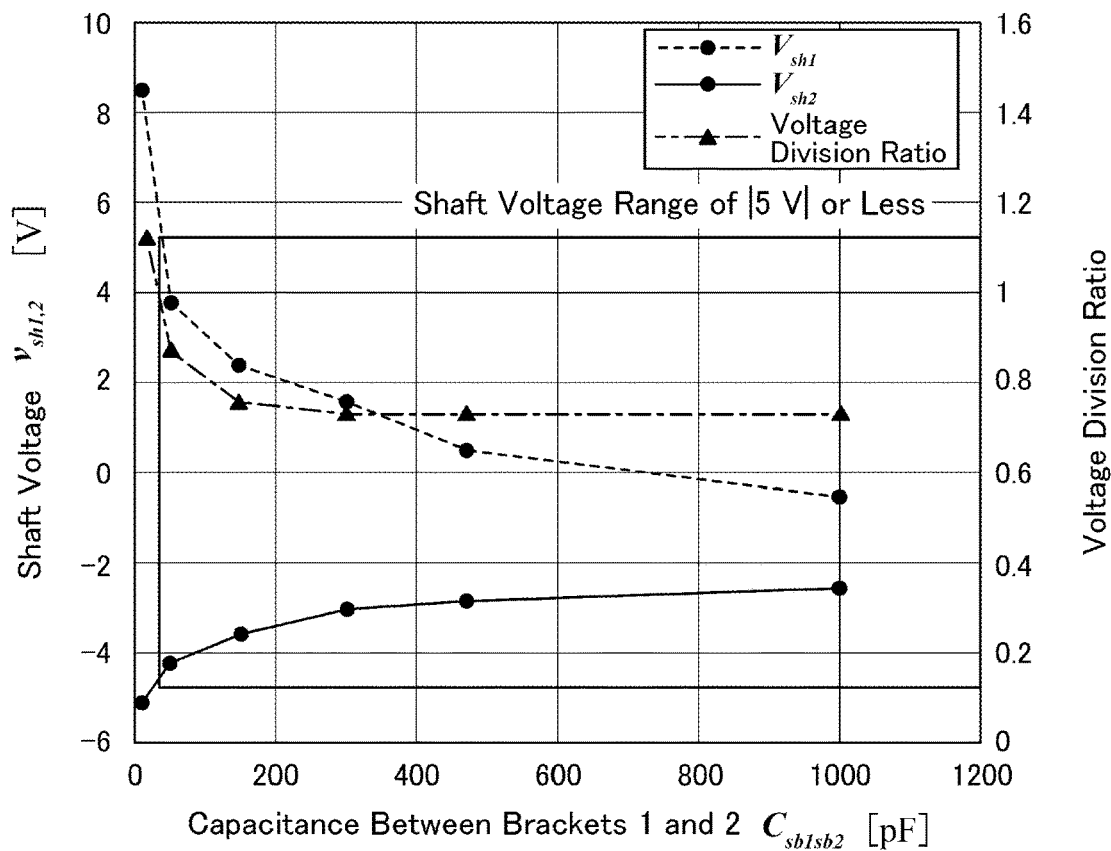
FIG. 3 is a graph illustrating a relationship among a capacitance between metal brackets, a shaft voltage, and a voltage division ratio of the motor according to the first embodiment.

FIG. 3 is an experimental result obtained by measuring the shaft voltage $V_{sh1}$ of the first bearing 5a (hereinafter, referred to as the first shaft voltage $V_{sh1}$) and the second shaft voltage $V_{sh2}$ of the second bearing 5b (hereinafter, referred to as the second shaft voltage $V_{sh2}$) by changing the value of the capacitance $C_{sb1sb2}$ of the capacitive member 15.

In the experiment, the capacitance $C_m$ of the magnets 11 was 21 pF, the diameter of the rotor 10 was 51 mm, and bearings 608 manufactured by MinebeaMitsumi Inc. were used as the first bearing 5a and the second bearing 5b. The grease having a consistency of 239 was used for the first bearing 5a and the second bearing 5b. The power supply voltage of the stator winding 3 was set to 391V, and the rotor 10 was rotated at a rotation speed of 1000 r/min.

In FIG. 3, the horizontal axis represents the value of the capacitance $C_{sb1sb2}$ of the capacitive member 15, and the vertical axis on the left side represents the first shaft voltage $V_{sh1}$ and the second shaft voltage $V_{sh2}$. The vertical axis on the right side of FIG. 3 is a value of a voltage division ratio by calculating the ratio (voltage division ratio) between the ratio (combined capacitance A1/$C_{nb1}$) and the ratio (combined capacitance B1/$C_{ns}$).

In the measurement of the first shaft voltage $V_{sh1}$ and the second shaft voltage $V_{sh2}$, the voltages of the inner rings were measured with reference to the outer rings of the first bearing 5a and the outer ring of the second bearing 5b, a case where the voltages of the inner rings each were higher than that of the outer rings was defined as plus, and a case where the voltages of the inner rings each were lower than that of the outer rings was defined as minus.

As is clear from FIG. 3, in a case where the value of the capacitance $C_{sb1sb2}$ is small, the first shaft voltage $V_{sh1}$ becomes a large positive voltage, and the second shaft voltage $V_{sh2}$ becomes a large negative voltage. It can be seen that as the value of the capacitance $C_{sb1sb2}$ is increased, the value of the first shaft voltage $V_{sh1}$ is gradually decreased, and the first shaft voltage $V_{sh1}$ gradually approaches the second shaft voltage $V_{sh2}$. In addition, it can be seen that as the value of the capacitance $C_{sb1sb2}$ is increased, the second shaft voltage $V_{sh2}$ also gradually becomes a small negative value.

The first shaft voltage $V_{sh1}$ and the second shaft voltage $V_{sh2}$ are potential differences of the voltages of the outer ring and the inner ring of the first bearing 5a and the second bearing 5b, and these potential differences are gradually reduced.

As illustrated in FIG. 3, it has been found that by adjusting the capacitance $C_{sb1sb2}$, the first shaft voltage $V_{sh1}$ and the second shaft voltage $V_{sh2}$ can be reduced to 5 V or less, which is an indication of the dielectric breakdown of the grease of a general bearing. It is also confirmed that waveform collapse of the shaft voltage waveform, which is a phenomenon of the dielectric breakdown of the grease oil films of the first bearing 5a and the second bearing 5b, does not occur.

In FIG. 3, the ratio (combined capacitance B1/$C_{ns}$) is 0.48. As illustrated in FIG. 3, it has been found that the absolute values of the first shaft voltage $V_{sh1}$ and the second shaft voltage $V_{sh2}$ can be reduced to 5 V or less when the ratio of the ratio (combined capacitance A1/$C_{nb1}$) to the ratio (combined capacitance B1/$C_{ns}$) is in a range of 0.7 to 1.1.

That is, the first shaft voltage $V_{sh1}$ and the second shaft voltage $V_{sh2}$ can be reduced by approximating or matching the ratio (combined capacitance A1/$C_{nb1}$) and the ratio (combined capacitance B1/$C_{ns}$).

The above mechanism will be described in detail with reference to FIG. 2.

Since the capacitance $C_{sb2}$ between the stator winding 3 and the second metal bracket 2 and the capacitance $C_{sb1sb2}$ of the capacitive member 15 are a series circuit, the second voltage $V_{sh2}$ of the second metal bracket 2 is a voltage obtained by dividing the first shaft voltage $V_{sh1}$ between the stator winding 3 and the first metal bracket 1, and the divided voltage is applied to both ends of the capacitance $C_{sb1sb2}$ of the capacitive member 15.

When the capacitance $C_{sb1sb2}$ of the capacitive member 15 is increased, the divided voltage applied to both ends of the capacitance $C_{sb1sb2}$ is decreased. Since the second shaft voltage $V_{sh2}$ generated at the outer ring of the second bearing 5b approaches the value of the first shaft voltage $V_{sh1}$, the second shaft voltage $V_{sh2}$ can also be reduced.

That is, the combined capacitance A1 including the capacitance $C_{sb1}$ between the stator winding 3 and the first metal bracket 1, the capacitance $C_{sb2}$ between the stator winding 3 and the second metal bracket 2, and the capacitance $C_{sb1sb2}$ of the capacitive member 15 is increased to achieve matching between the combined capacitance distribution on the stator 18 side and the combined capacitance distribution on the rotor 10 side, and thereby the first shaft voltage $V_{sh1}$ and the second shaft voltage $V_{sh2}$ can be reduced.

As described above, in the first embodiment, the capacitive member 15 is inserted between the first metal bracket 1 and the second metal bracket 2 to achieve matching between the capacitance distribution on the stator 18 side and the capacitance distribution on the rotor 10 side, and thereby the first shaft voltage $V_{sh1}$ and the second shaft voltage $V_{sh2}$ are reduced, so that the effect of suppressing electrolytic corrosion is obtained.

As described above, the capacitance $C_{sb1}$ between the stator winding 3 and the first metal bracket 1, the capacitance $C_{sb2}$ between the stator winding 3 and the second metal bracket 2, and the capacitance $C_{sb1sb2}$ of the capacitive member 15 are adjusted to achieve matching between the capacitance distribution on the stator side and the capacitance distribution on the rotor side, and thereby the shaft voltage of the first bearing 5a can be reduced. Further, since the capacitance $C_{sb2}$ between the stator winding 3 and the second metal bracket 2 and the capacitance $C_{sb1sb2}$ of the capacitive member 15 are a series circuit, the second voltage $V_{sh2}$ of the second metal bracket 2 is a voltage obtained by dividing the first shaft voltage $V_{sh1}$ between the stator winding 3 and the first metal bracket 1. When the capacitance of the capacitive member 15 is increased, the voltage divided to the both ends is decreased, and the voltage generated at the outer ring of the second bearing 5b approaches the value of the shaft voltage of the first bearing 5a, so that the shaft voltage of the second bearing 5b can also be reduced. Thereby, the motor 50 according to the first embodiment has an extremely excellent effect of suppressing the occurrence of electrolytic corrosion of the bearing.

In addition, the motor 50 according to the first embodiment is excellent in manufacturability because the capacitive member 15 can be easily attached to a vacant location inside the motor 50.

Further, in the motor 50 according to the first embodiment, since the capacitive member 15 is compact, the outer diameter dimension and the shape of the motor 50 are not increased.

Second Embodiment

As an example of an electric apparatus according to the present disclosure, a configuration of an air conditioner indoor unit will be described in detail as a second embodiment. The electric apparatus according to the present disclosure is not necessarily limited to these examples.

Figure 4:
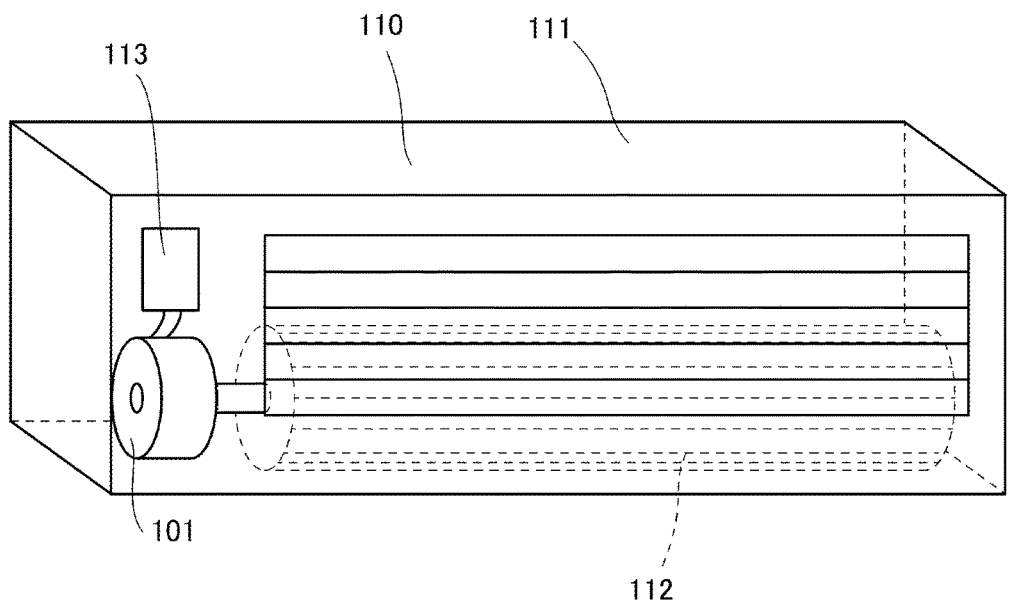
FIG. 4 is a perspective view of an aspect of an electric apparatus using the motor according to the first embodiment.

In FIG. 4, a brushless motor 101 is provided in a housing 111 of an air conditioner indoor unit 110. A cross flow fan 112, which is a blower fan, is attached to a rotation shaft of the brushless motor 101. The brushless motor 101 is driven by a motor drive device 113. The brushless motor 101 is rotated by the energization from the motor drive device 113, and the cross flow fan 112 is rotated accordingly. The rotation of the cross flow fan 112 causes an indoor unit heat exchanger (not illustrated) to blow air-conditioned air into the room. Here, for example, the motor 50 of the first embodiment described above can be applied to the brushless motor 101.

The electric apparatus of the present disclosure includes the brushless motor and the housing in which the brushless motor is mounted, and employs the motor 50 of the first embodiment as the brushless motor.

Third Embodiment

As an example of the electric apparatus according to the present disclosure, a configuration of an air conditioner outdoor unit will be described in detail as a third embodiment.

Figure 5:
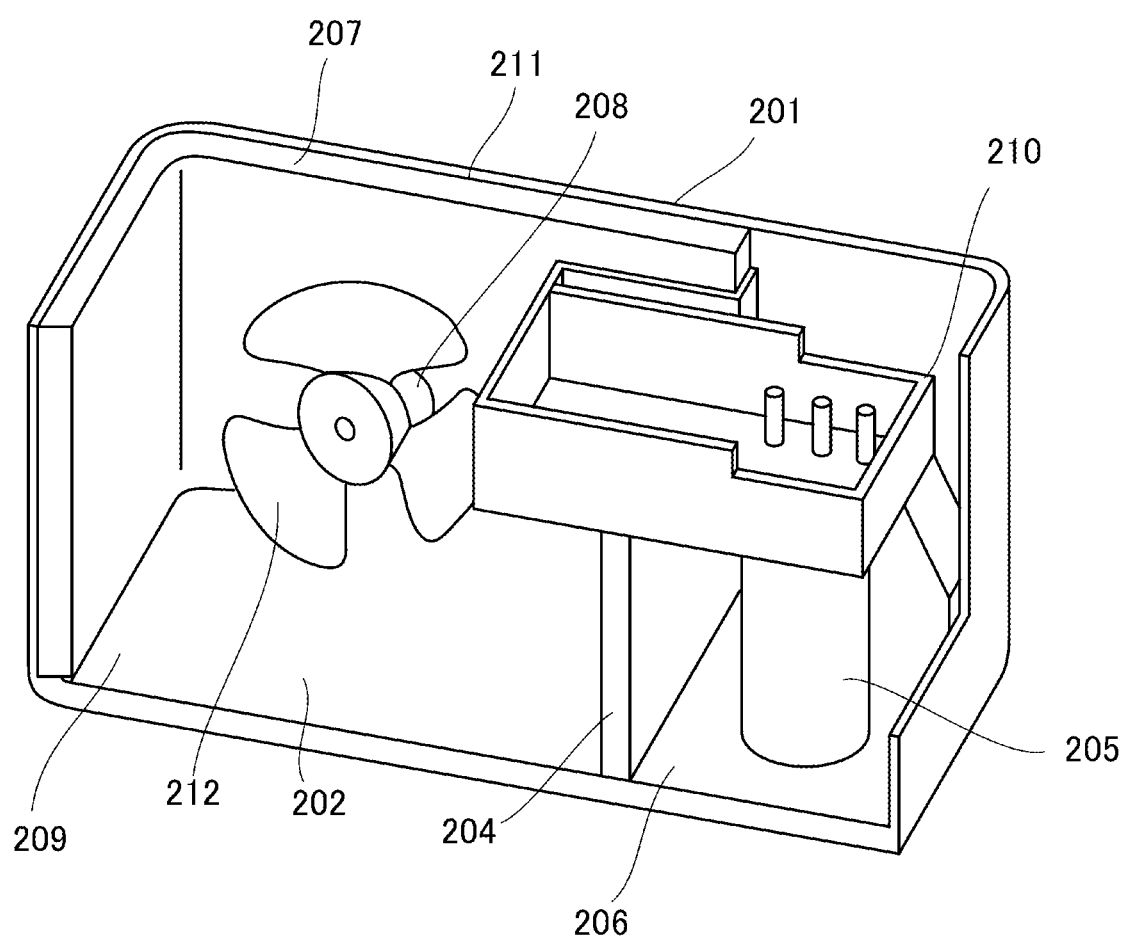
FIG. 5 is a perspective view of an aspect of another electric apparatus using the motor according to the first embodiment.

In FIG. 5, an air conditioner outdoor unit 201 includes a brushless motor 208 inside a housing 211. In the brushless motor 208, a blower fan 212 is attached to a rotation shaft.

The air conditioner outdoor unit 201 is partitioned into a compressor chamber 206 and a heat exchanger chamber 209 by a partition plate 204 erected on a bottom plate 202 of the housing 211. The compressor chamber 206 is provided with a compressor 205. A heat exchanger 207 and a blower fan motor are disposed in the heat exchanger chamber 209. An electric component box 210 is provided above the partition plate 204.

In the blower fan motor, the blower fan 212 is rotated in accordance with the rotation of the brushless motor 208 driven by the motor drive device housed in the electric component box 210, and blows air to the heat exchanger chamber 209 through the heat exchanger 207. Here, for example, the motor 50 of the first embodiment described above can be applied to the brushless motor 208.

The electric apparatus of the present disclosure includes the brushless motor and the housing in which the brushless motor is mounted, and employs the motor 50 of the first embodiment as the brushless motor.

Fourth Embodiment

As an example of the electric apparatus according to the present disclosure, a configuration of a water heater will be described in detail as a fourth embodiment.

Figure 6:
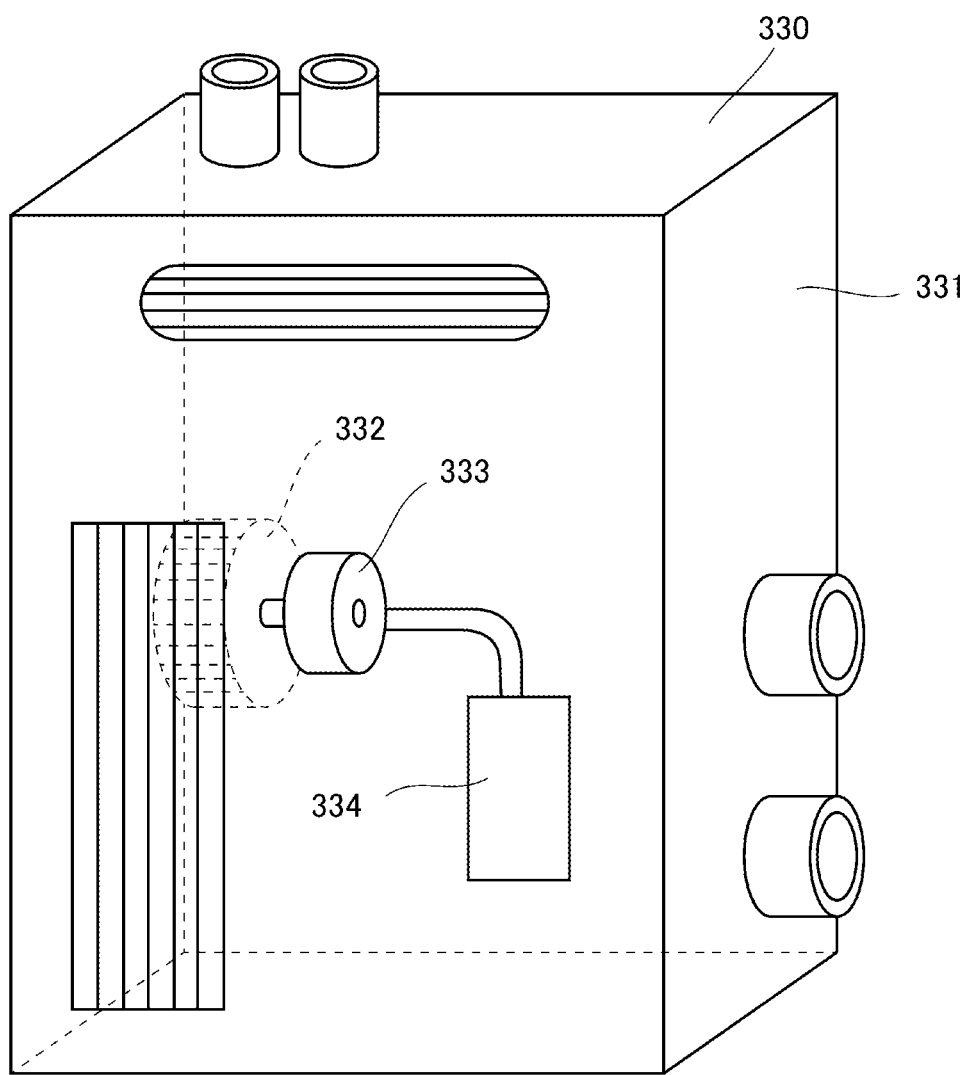
FIG. 6 is a perspective view of an aspect of another electric apparatus using the motor according to the first embodiment.

In FIG. 6, a brushless motor 333 is provided in a housing 331 of a water heater 330. A blower fan 332 is attached to a rotation shaft of the brushless motor 333.

The brushless motor 333 is driven by a motor drive device 334. The brushless motor 333 is rotated by the energization from the motor drive device 334, and the blower fan 332 is rotated accordingly. By the rotation of the blower fan 332, air necessary for combustion is blown to a fuel vaporization chamber (not illustrated). Here, for example, the motor 50 of the first embodiment described above can be applied to the brushless motor 333.

The electric apparatus of the present disclosure includes the brushless motor and the housing in which the brushless motor is mounted, and employs the motor 50 of the first embodiment as the brushless motor.

Figure 7:
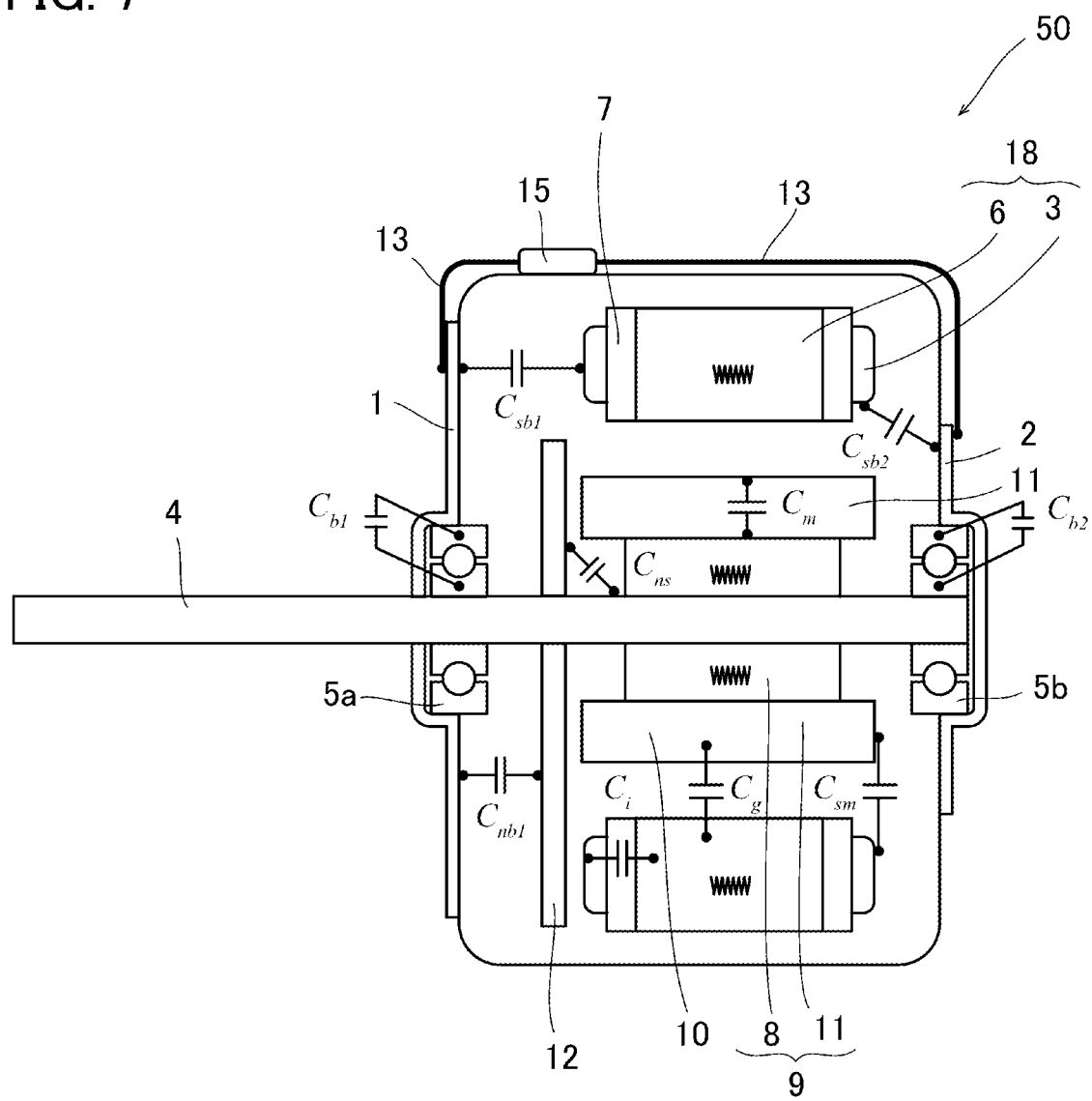
FIG. 7 is a schematic configuration diagram of a section of a motor according to the first embodiment as another aspect of the present disclosure.

In FIG. 1 of the first embodiment, the capacitive member 15 is disposed inside the motor 50, but the capacitive member 15 may be disposed outside the motor 50 as illustrated in FIG. 7. The capacitive member 15 may be disposed anywhere outside the motor 50, and is disposed, for example, on an outer wall of the housing of the motor 50. Alternatively, the capacitive member 15 may be provided, for example, at a position away from the motor 50. Thus, the motor can be made more compact. The aspect of FIG. 7 is not limited to the first embodiment, and is also applicable to the second to fourth embodiments.

In FIG. 1 of the first embodiment, the printed circuit board 12 including the drive circuit is provided inside the motor 50, but the printed circuit board 12 including the drive circuit may be provided outside the motor 50. In this case, the motor 50 can be made compact.

In the second to fourth embodiments, the blower fan is used as a component rotated by the motor, but the rotated component is not particularly limited.

Note that the invention according to the first to fourth embodiments can be replaced or combined as long as there is no contradiction.

As described above, the present disclosure includes a motor described in the following items and an electric apparatus including the motor.

Item 1 a stator that includes a stator core and a stator winding wound around the stator core;

a rotor that includes a rotating body and a shaft, the rotating body holding magnets in a circumferential direction of the rotor and facing the stator, or holding magnets in a spoke shape from a center, the shaft fastened to the rotating body and penetrating a center of the rotating body;

a first bearing and a second bearing that each support the rotating body;

a first metal bracket and a second metal bracket that respectively fix the first bearing and the second bearing; and a capacitive member that is located between the first metal bracket and the second metal bracket, and has a capacitance $C_{sb1sb2}$ that is configured in such a manner that a combined capacitance A1 is increased to cause a first ratio to be approximated or matched to a second ratio, where the first shaft voltage $V_{sh1}$ and the second shaft voltage $V_{sh2}$ are respectively a voltage of the first bearing and a voltage of the second bearing, where the combined capacitance A1 includes the capacitance $C_{sb1sb2}$, a capacitance $C_{sb1}$ located between the stator core and the first metal bracket, and a capacitance $C_{sb2}$ located between the stator core and the second metal bracket, where the first ratio is a ratio of the combined capacitance A1 to a capacitance $C_{nb1}$ located between a portion having a zero reference potential of a drive circuit applying a voltage to the stator winding and the first metal bracket, where the second ratio is a ratio of a combined capacitance B1 to a capacitance $C_{ns}$ located between the portion having the zero reference potential and the shaft, and where the combined capacitance B1 includes a capacitance $C_i$ located between the stator winding and the stator core, a capacitance $C_g$ located between the stator core and the magnets, a capacitance $C_{sm}$ located between the stator winding and the magnets, and a capacitance $C_m$ being a capacitance of the magnets.

According to the above aspect, the combined capacitance A1 is increased by increasing the capacitance $C_{sb1sb2}$, so that the voltage division ratio A1 ($C_{nb1}$/combined capacitance A1) and the voltage division ratio B1 ($C_{ns}$/combined capacitance B1) are matched or approximated, and thereby the occurrence of electrolytic corrosion of the bearing in the motor can be suppressed.

Item 2

The motor according to Item 1, wherein the first metal bracket and the second metal bracket are insulated from the stator core of the stator by an insulating resin or a space.

According to the above aspect, due to the insulation, it is easy to generate a rotor magnetic field.

Item 3

The motor according to Item 1 or 2, wherein the capacitive member is located outside a housing formed by the first metal bracket, the second metal bracket and the stator.

According to the above aspect, the motor can be made compact without being restricted by the space of the capacitive member.

Item 4

The motor according to any one of Items 1 to 3, wherein the capacitive member is located inside a housing formed by the first metal bracket, the second metal bracket and the stator.

According to the above aspect, the space outside the motor is not affected.

Item 5

The motor according to any one of Items 1 to 4, wherein a capacitance $C_{sb1sb2}$ is configured in such a manner that the combined capacitance A1 is increased, and that a first potential difference generated between an inner ring and an outer ring of the first bearing is reduced, or a second potential difference generated between an inner ring and an outer ring of the second bearing is reduced.

According to the above aspect, by increasing the combined capacitance A1 including the capacitance $C_{sb1}$ between the stator winding and the first metal bracket, the capacitance $C_{sb2}$ between the stator winding and the second metal bracket, and the capacitance $C_{sb1sb2}$ by using the capacitance $C_{sb1sb2}$, a voltage division ratio A1 ($C_{nb1}$/combined capacitance A1) and a voltage division ratio B1 ($C_{ns}$/combined capacitance B1) are approximated or matched, and thereby the occurrence of electrolytic corrosion of the bearing in the motor can be suppressed.

Item 6

The motor according to any one of Items 1 to 5,
wherein a printed circuit board including the drive circuit is located inside a housing formed by the first metal bracket, the second metal bracket and the stator.

According to the above aspect, the space outside the motor is not affected.

Item 7 wherein a printed circuit board including the drive circuit is located outside a housing formed by the first metal bracket, the second metal bracket and the stator.

wherein an outer diameter of the first metal bracket is the same as or larger than an outer diameter of the second metal bracket.

According to the above aspect, the first metal bracket has an outer diameter equal to or larger than the outer diameter of the second metal bracket, and thereby the shaft can be stably rotated.

Item 8

The motor according to any one of Items 1 to 5 and 7,
wherein an outer diameter of the first metal bracket is the same as or larger than an outer diameter of the second metal bracket.

Item 9

An electric apparatus including the motor according to any one of Items 1 to 9; and a blower fan that is driven by the motor.

According to the above aspect, it is possible to suppress the occurrence of electrolytic corrosion of the bearing of the motor of the electric apparatus including the blower fan.

What is claimed is:

1. A motor comprising:
a stator that includes a stator core and a stator winding wound around the stator core;
a rotor that includes a rotating body and a shaft, the rotating body holding magnets in a circumferential direction of the rotor and facing the stator, or holding magnets in a spoke shape from a center, the shaft fastened to the rotating body and penetrating a center of the rotating body;
a first bearing and a second bearing that each support the rotating body;
a first metal bracket and a second metal bracket that respectively fix the first bearing and the second bearing; and
a capacitive member that is located between the first metal bracket and the second metal bracket, and has a capacitance $C_{sb1sb2}$ that is configured in such a manner that a combined capacitance A1 is increased to cause a first ratio to be approximated or matched to a second ratio,
where the first shaft voltage $V_{sh1}$ and the second shaft voltage $V_{sh2}$ are respectively a voltage of the first bearing and a voltage of the second bearing,
where the combined capacitance A1 includes the capacitance $C_{sb1sb2}$, a capacitance $C_{sb1}$ located between the stator core and the first metal bracket, and a capacitance $C_{sb2}$ located between the stator core and the second metal bracket,
where the first ratio is a ratio of the combined capacitance A1 to a capacitance $C_{nb1}$ located between a portion having a zero reference potential of a drive circuit applying a voltage to the stator winding and the first metal bracket,
where the second ratio is a ratio of a combined capacitance B1 to a capacitance $C_{ns}$ located between the portion having the zero reference potential and the shaft, and where the combined capacitance B1 includes a capacitance $C_i$ located between the stator winding and the stator core, a capacitance $C_g$ located between the stator core and the magnets, a capacitance $C_{sm}$ located between the stator winding and the magnets, and a capacitance $C_m$ being a capacitance of the magnets.

2. The motor according to claim 1,
wherein the first metal bracket and the second metal bracket are insulated from the stator core of the stator by an insulating resin or a space.

3. The motor according to claim 1,
wherein the capacitive member is located outside a housing formed by the first metal bracket, the second metal bracket and the stator.

4. The motor according to claim 1,
wherein the capacitive member is located inside a housing formed by the first metal bracket, the second metal bracket and the stator.

5. The motor according to claim 1,
wherein a capacitance $C_{sb1sb2}$ is configured in such a manner that the combined capacitance A1 is increased, and that a first potential difference generated between an inner ring and an outer ring of the first bearing is reduced, or a second potential difference generated between an inner ring and an outer ring of the second bearing is reduced.

6. The motor according to claim 1,
wherein a printed circuit board including the drive circuit is located inside a housing formed by the first metal bracket, the second metal bracket and the stator.

7. The motor according to claim 1,
wherein a printed circuit board including the drive circuit is located outside a housing formed by the first metal bracket, the second metal bracket and the stator.

8. The motor according to claim 1,
wherein an outer diameter of the first metal bracket is the same as or larger than an outer diameter of the second metal bracket.

9. An electric apparatus comprising:
a motor; and
a blower fan driven by the motor,
wherein the motor includes:
a stator that includes a stator core and a stator winding wound around the stator core;
a rotor that includes a rotating body and a shaft, the rotating body holding magnets in a circumferential direction of the rotor and facing the stator, or holding magnets in a spoke shape from a center, the shaft fastened to the rotating body and penetrating a center of the rotating body;
a first bearing and a second bearing that each support the rotating body;
a first metal bracket and a second metal bracket that respectively fix the first bearing and the second bearing; and
a capacitive member that is located between the first metal bracket and the second metal bracket, and has a capacitance $C_{sb1sb2}$ that is configured in such a manner that a combined capacitance A1 is increased to cause a first ratio to be approximated or matched to a second ratio,
where the first shaft voltage $V_{sh1}$ and the second shaft voltage $V_{sh2}$ are respectively a voltage of the first bearing and a voltage of the second bearing,
where the combined capacitance A1 includes the capacitance $C_{sb1sb2}$, a capacitance $C_{sb1}$ located between the stator core and the first metal bracket, and a capacitance $C_{sb2}$ located between the stator core and the second metal bracket, where the first ratio is a ratio of the combined capacitance A1 to a capacitance $C_{nb1}$ located between a portion having a zero reference potential of a drive circuit applying a voltage to the stator winding and the first metal bracket, where the second ratio is a ratio of a combined capacitance B1 to a capacitance $C_{ns}$ located between the portion having the zero reference potential and the shaft, and where the combined capacitance B1 includes a capacitance $C_i$ located between the stator winding and the stator core, a capacitance $C_g$ located between the stator core and the magnets, a capacitance $C_{sm}$ located between the stator winding and the magnets, and a capacitance $C_m$ being a capacitance of the magnets.

* * * * *